US012425948B2

(12) United States Patent
Patel et al.

(10) Patent No.: US 12,425,948 B2
(45) Date of Patent: Sep. 23, 2025

(54) SYSTEMS AND METHODS FOR UPDATING A POLICY OF A USER EQUIPMENT IN FOURTH-GENERATION NETWORK COVERAGE

(71) Applicant: Verizon Patent and Licensing Inc., Basking Ridge, NJ (US)

(72) Inventors: Samirkumar Patel, Middlesex, NJ (US); Jeremy Nacer, Boca Raton, FL (US); Axel Hallo De Wolf, Whippany, NJ (US); Alexandre De Melo, Basking Ridge, NJ (US); Mary Williams, Miltona, MN (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 423 days.

(21) Appl. No.: 18/164,726

(22) Filed: Feb. 6, 2023

(65) Prior Publication Data

US 2024/0267827 A1    Aug. 8, 2024

(51) Int. Cl.
*H04W 40/24* (2009.01)
*H04W 40/02* (2009.01)
*H04W 48/18* (2009.01)

(52) U.S. Cl.
CPC ......... *H04W 40/248* (2013.01); *H04W 40/02* (2013.01); *H04W 48/18* (2013.01)

(58) Field of Classification Search
CPC . H04W 28/0865; H04W 40/02; H04W 48/18; H04W 76/12; H04W 40/248
See application file for complete search history.

(56) References Cited

U.S. PATENT DOCUMENTS

| 2022/0361080 A1* | 11/2022 | Soliman | H04W 40/02 |
| 2024/0022989 A1* | 1/2024 | Shekhar | H04W 40/02 |
| 2024/0073772 A1* | 2/2024 | Gupta | H04W 76/12 |
| 2024/0154871 A1* | 5/2024 | Lin | H04W 28/18 |
| 2024/0306085 A1* | 9/2024 | Izumi | H04W 48/18 |
| 2024/0373332 A1* | 11/2024 | Izumi | H04W 88/02 |
| 2025/0063336 A1* | 2/2025 | Tiwari | H04W 8/18 |

* cited by examiner

*Primary Examiner* — Awet Haile

(57) ABSTRACT

A user equipment (UE) may store a default user equipment route selection policy (URSP) and may receive, from a fourth-generation (4G) core network, a default protocol configuration option (PCO) value for a default network slice of the 4G core network. The UE may utilize the default network slice based on the default URSP and the default PCO value and may receive a request to update the default URSP with a new URSP associated with a new network slice of the 4G core network. The UE may update the default URSP with the new URSP to generate an updated URSP and may receive, from the 4G core network, a new PCO value for the new network slice of the 4G core network. The UE may utilize the default network slice and the new network slice based on the updated URSP, the default PCO value, and the new PCO value.

20 Claims, 7 Drawing Sheets

SYSTEMS AND METHODS FOR UPDATING A POLICY OF A USER EQUIPMENT IN FOURTH-GENERATION NETWORK COVERAGE

BACKGROUND

Network slicing requires a user equipment (UE) to connect to a particular network device (e.g., a policy control function (PCF)) in a fifth-generation (5G) core network, which is only available when the UE is in a standalone (SA) mode. If a UE is in fourth-generation (4G) or non-standalone (NSA) coverage, the UE cannot access network slicing even though this service is available to the UE. Currently, there are large areas of 4G or NSA coverage without corresponding 5G SA coverage.

DETAILED DESCRIPTION OF EXAMPLE EMBODIMENTS

Figure 1A:
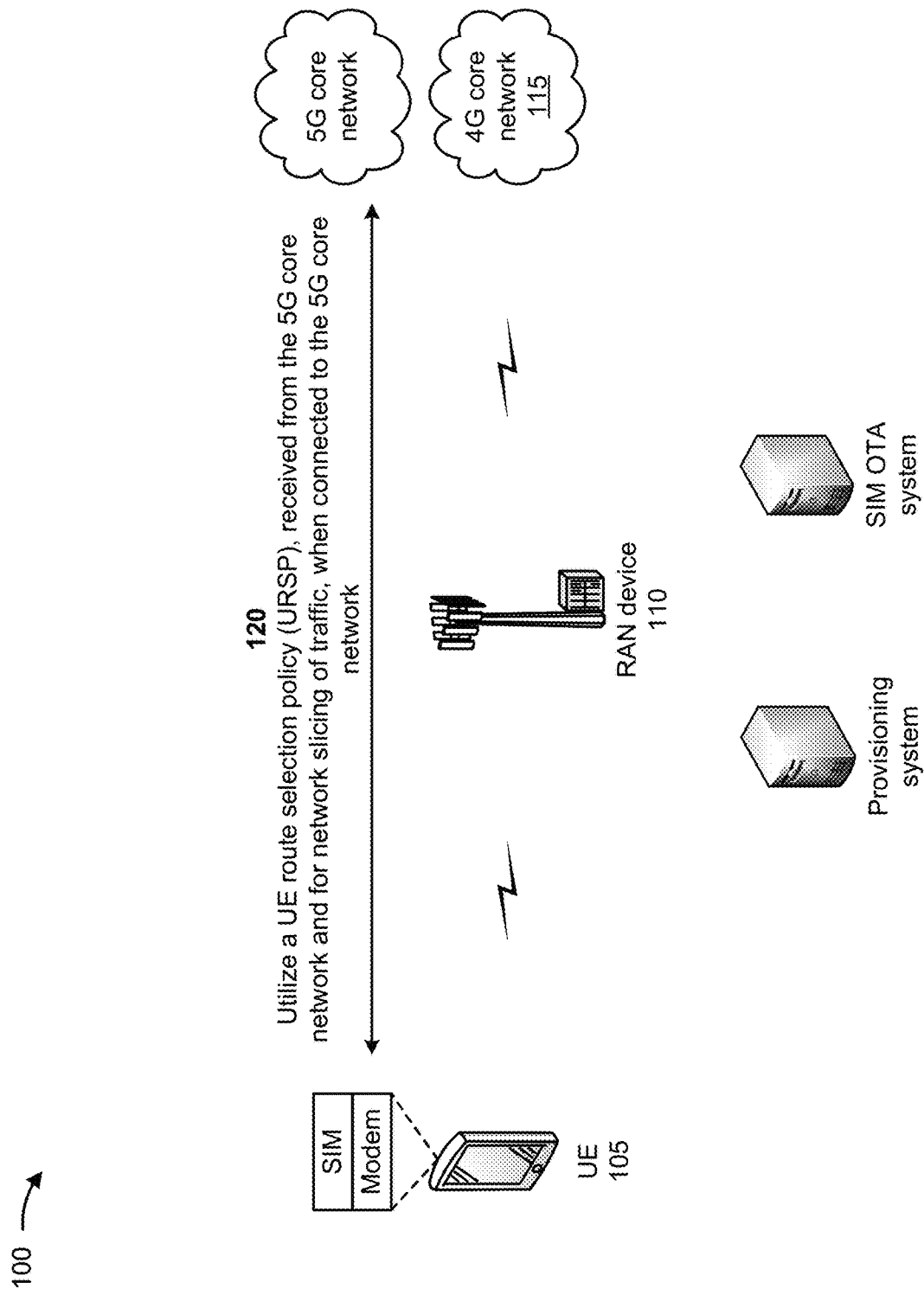
FIGS. 1A-1D are diagrams of an example associated with updating a policy of a user equipment (UE) in fourth-generation (4G) network or fifth (5G) network coverage.

The following detailed description of example implementations refers to the accompanying drawings. The same reference numbers in different drawings may identify the same or similar elements.

The Third-Generation Partnership Project (3GPP) permits multiple slicing support when a user equipment (UE) is in fifth-generation (5G) core network coverage. The UE and the 5G core network use UE route selection policies (URSPs) to route traffic over different network slices. URSPs may be stored on the UE (e.g., on a modem or a subscriber identity module (SIM) of the UE) and may be delivered from a network device of the 5G core network (e.g., a PCF) to the UE while the UE is in the 5G core network.

The 5G core network can only deliver URSP information when the UE is in 5G core network coverage. When the UE is in a fourth-generation (4G) core network or NSA (e.g., using an evolved packet core (EPC)), there is no mechanism to deliver the URSP information to the UE. Thus, the UE has to use URSP information (e.g., stored on the UE) to provide a quality of service (QoS) while the UE is in the 4G core network. However, for UE-stored URSP information, if there is any provisioning change from a backend (e.g., the 4G core network or a provisioning system) or a user of the UE pauses and/or resumes use of network slices, there is no way for the 4G core network to push updated URSP information to the UE while the UE is in 4G core network coverage. This results in poor user experience issues for the UE.

Thus, current network and UE configurations consume computing resources (e.g., processing resources, memory resources, communication resources, and/or the like), networking resources, and/or other resources associated with failing to update URSP information for a UE in a 4G core network, creating poor user experience issues for the UE based on failing to update the URSP information for the UE in the 4G core network, failing to provide proper network slices for a UE that pauses and/or resumes network slices, and/or the like.

Some implementations described herein update a policy of a UE in 4G network coverage. For example, a UE may store a default URSP and may receive, from a 4G core network, a default protocol configuration option (PCO) value for a default network slice of the 4G core network. The UE may utilize the default network slice based on the default URSP and the default PCO value and may receive a request to update the default URSP with a new URSP associated with a new network slice of the 4G core network. The UE may update, based on the request, the default URSP with the new URSP to generate an updated URSP and may receive, from the 4G core network, a new PCO value for the new network slice of the 4G core network. The UE may utilize the default network slice and the new network slice based on the updated URSP, the default PCO value, and the new PCO value.

In this way, a policy of a UE in 4G network coverage may be updated. For example, the UE may store a preconfigured URSP on a SIM of the UE and may utilize the preconfigured URSP for network slicing information when in 4G network coverage. When the UE is in 5G network coverage, the UE may utilize URSP information received from the PCF of the 5G core network. When the UE is in 4G network coverage and there is any change on network slicing provisioning, the 4G core network may trigger URSP updates for the SIM of the UE via a SIM OTA system. The URSP updates may change the preconfigured URSP stored on the SIM of the UE. The UE may enable or disable URSP information and specific network slices using operator-defined PCO values. Thus, the UE may conserve computing resources, networking resources, and/or other resources that would have otherwise been consumed by failing to update URSP information for the UE in the 4G core network, creating poor user experience issues for the UE based on failing to update the URSP information for the UE in the 4G core network, failing to provide proper network slices when the UE pauses and/or resumes network slices, and/or the like.

Figure 1B:
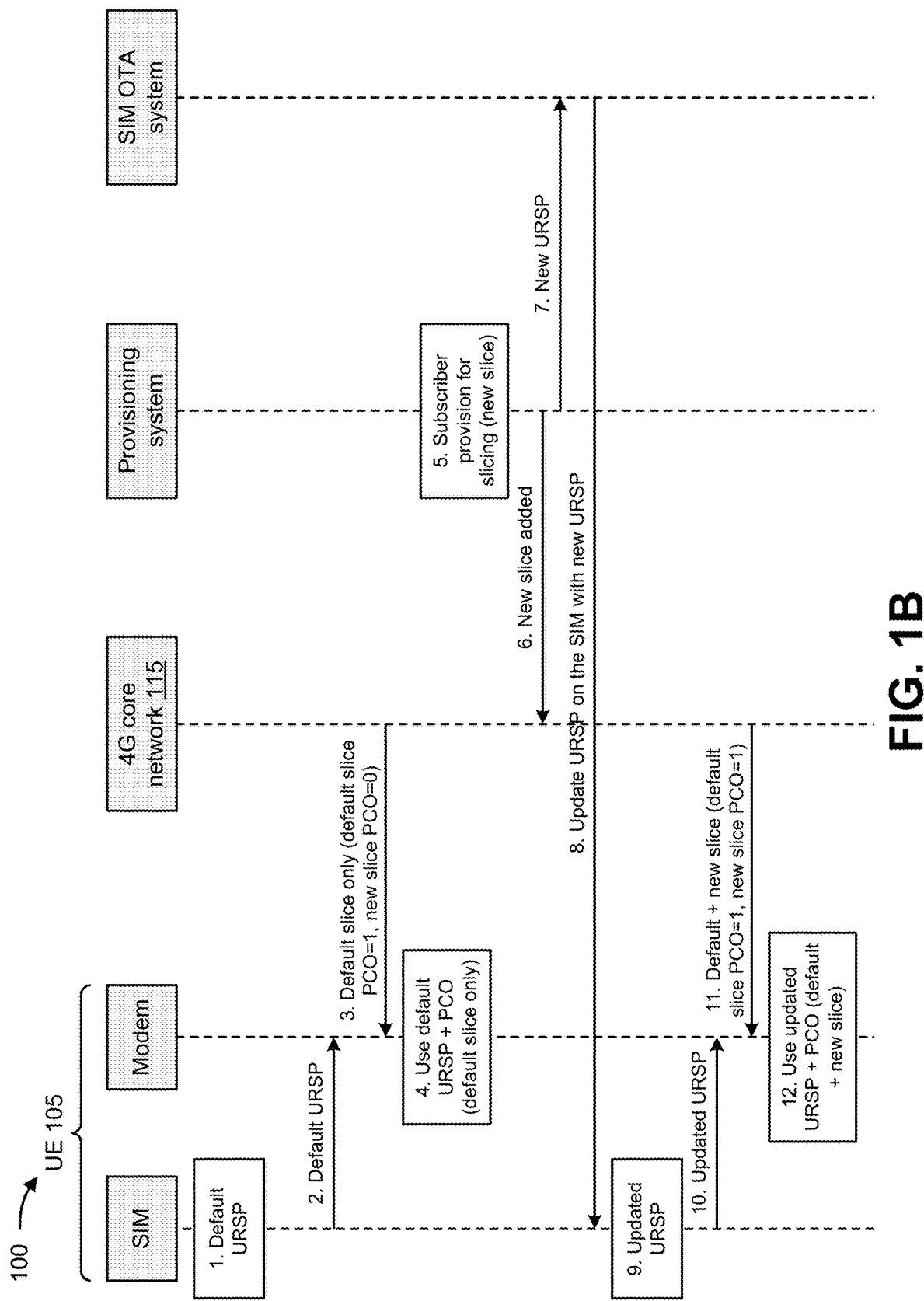
Figure 1C:
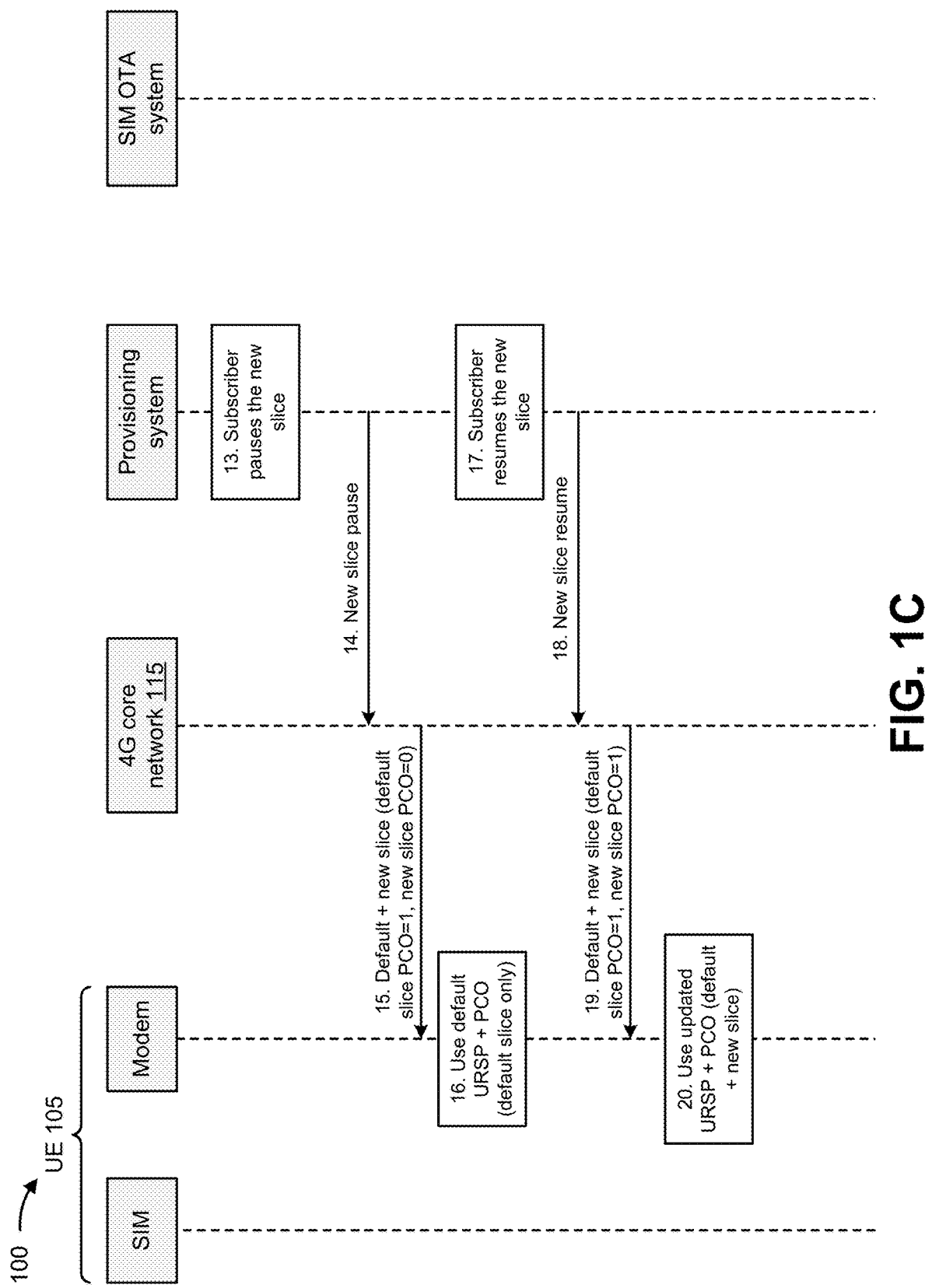
Figure 1D:
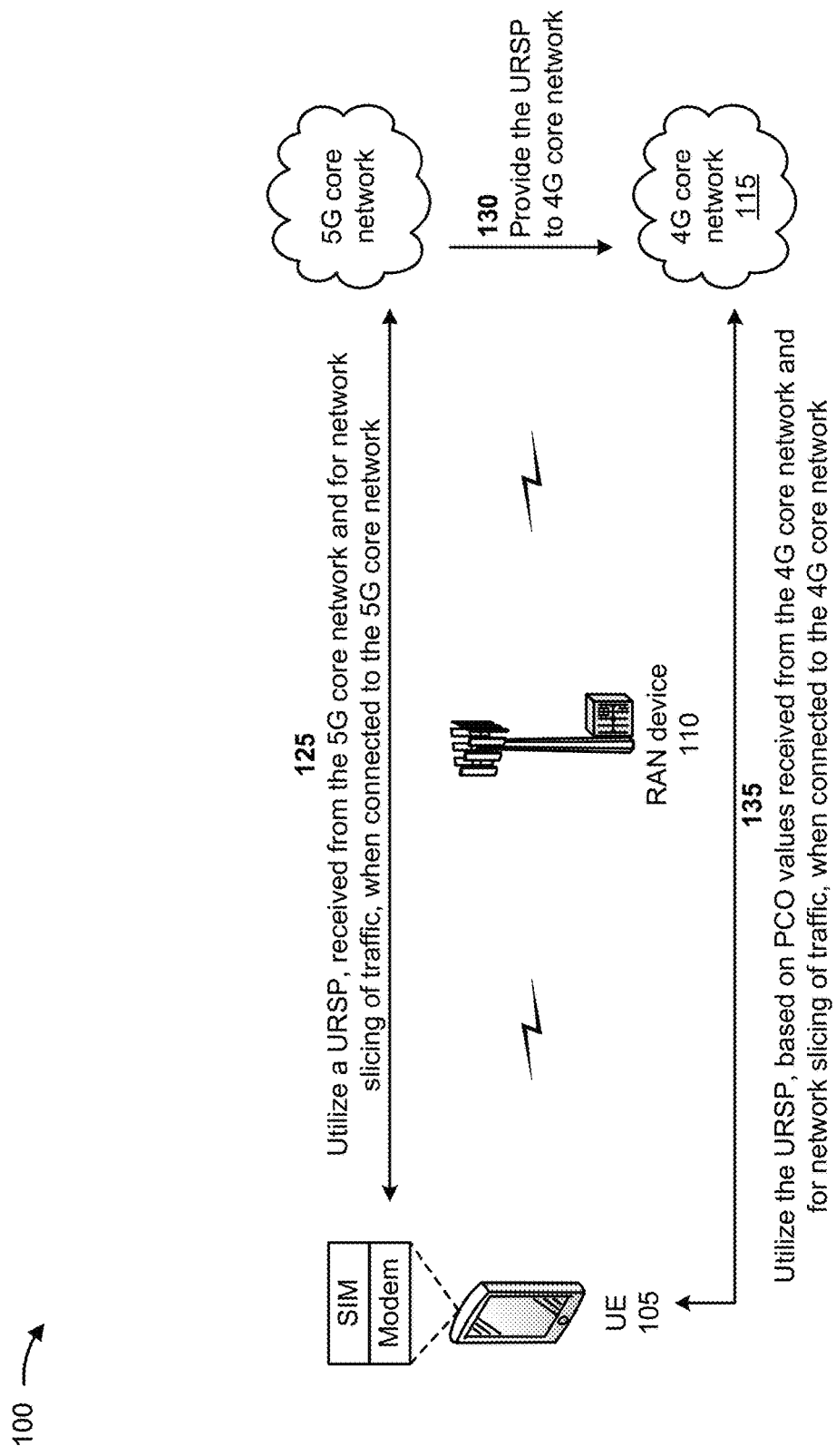

FIGS. 1A-1D are diagrams of an example 100 associated with updating a policy of a UE in 5G network coverage (FIG. 1A) and with updating a policy of a UE in 4G network coverage (FIGS. 1B-1D). As shown in FIGS. 1A-1D, example 100 includes a UE 105 (e.g., including a SIM and a modem), a radio access network (RAN) device 110, a 4G core network 115, a 5G core network, a provisioning system, and a SIM over-the-air (OTA) system. Further details of the UE 105, the SIM, the modem, the RAN device 110, the 4G core network 115, the 5G core network, the provisioning system, and the SIM OTA system are provided elsewhere herein.

As shown in FIG. 1A, and by reference number 120, the UE 105 may utilize a URSP, received from the 5G core network and for network slicing of traffic, when connected to the 5G core network. For example, when connecting to a 5G core network, network slicing may require the UE 105 to connect to a particular network device (e.g., a PCF) in the 5G core network. When the UE 105 is connected to the 5G core network, the UE 105 may connect to the PCF and may receive a URSP from the PCF. The URSP provides a way to manage network slice information for the UE 105. The URSP is a network slice feature (e.g., enabled by the PCF) which informs the UE 105 about a network slice status. The URSP enables the UE 105 to automatically switch between different network slices according to which application is being utilized by the UE 105. Thus, the UE 105 may utilize the URSP for network slicing of traffic when the UE 105 is connected to the 5G core network.

FIGS. 1B and 1C depict call flow diagrams associated with updating network slice policies (e.g., URSPs) for the UE 105 when the UE 105 is connected to the 4G core network 115. As shown at step 1 of FIG. 1B, a default URSP (e.g., a preconfigured URSP) may be stored in the SIM of the UE 105. When the UE 105 is connected to the 4G core network 115, the UE 105 may utilize the default URSP stored in the SIM for network slicing information. As shown at step 2, when the UE 105 is connected to the 4G core network 115, the SIM of the UE 105 may provide the default URSP to the modem of the UE 105 and the modem may utilize the default URSP for network slicing information.

As shown at step 3 of FIG. 1B, the modem of the UE 105 may receive, from the 4G core network 115 and based on the default URSP, information associated with a default network slice of the 4G core network 115. The information associated with the default network slice may include a default PCO value (e.g., with a default slice PCO=1) for the default network slice of the 4G core network 115 and a new PCO value (e.g., with a second value of PCO=0) for a new network slice of the 4G core network 115. The default PCO value may indicate that the default network slice is enabled for the UE 105 and the second value of the new PCO value may indicate that the new network slice is not enabled for the UE 105. As shown at step 4, the modem of the UE 105 may utilize the default network slice based on the default URSP and the default PCO value. The UE 105 may not utilize the new network slice since the new PCO value indicates that the new network slice is not enabled for the UE 105.

As shown at step 5 of FIG. 1B, the provisioning system may generate provisioning information for the new network slice of the 4G core network 115. In some implementations, a subscriber associated with the UE 105 may utilize the provisioning system to request the new network slice, and the provisioning system may generate the provisioning information for the new network slice based on the request. As shown at step 6, the provisioning information for the new network slice may cause the 4G core network 115 to enable the new network slice for the UE 105. As shown at step 7, the provisioning system may provide a new URSP to the SIM OTA system. The new URSP may include information associated with the new network slice of the 4G core network 115.

As shown at step 8 of FIG. 1B, the SIM of the UE 105 may receive, from the SIM OTA system, a request to update the default URSP with the new URSP associated with a new network slice of the 4G core network 115. As shown at step 9, the SIM of the UE 105 may update, based on the request, the default URSP with the new URSP to generate an updated URSP. When the UE 105 is connected to the 4G core network 115, the UE 105 may utilize the updated URSP stored in the SIM for network slicing information. As shown at step 10, when the UE 105 is connected to the 4G core network 115, the SIM of the UE 105 may provide the updated URSP to the modem of the UE 105 and the modem may utilize the updated URSP for network slicing information.

As shown at step 11 of FIG. 1B, the modem of the UE 105 may receive, from the 4G core network 115 and based on the updated URSP, information associated with the default network slice and the new network slice of the 4G core network 115. The information associated with the default network slice and the new network slice may include a default PCO value (e.g., with default slice PCO=1) for the default network slice of the 4G core network 115 and a new PCO value (e.g., with new slice PCO=1) for the new network slice of the 4G core network 115. The default PCO value may indicate that the default network slice is enabled for the UE 105 and the new PCO value may indicate that the new network slice is enabled for the UE 105. As shown at step 12, the modem of the UE 105 may utilize the default network slice and the new network slice based on the updated URSP, the default PCO value, and the new PCO value.

As shown at step 13 of FIG. 1C, the provisioning system may enable a subscriber associated with the UE 105 to pause the new network slice of the 4G core network 115. In some implementations, the subscriber associated with the UE 105 may utilize the provisioning system to pause the new network slice, and the provisioning system may generate provisioning information that causes the new network slice to be paused. As shown at step 14, the provisioning system may provide the provisioning information to the 4G core network 115. The provisioning information may cause the 4G core network 115 to pause the new network slice for the UE 105.

As shown at step 15 of FIG. 1C, the modem of the UE 105 may receive, from the 4G core network 115, information associated with the default network slice and the new network slice of the 4G core network 115. The information associated with the default network slice and the new network slice may include a default PCO value (e.g., with default slice PCO=1) for the default network slice of the 4G core network 115 and a new PCO value (e.g., with new slice PCO=0) for the new network slice of the 4G core network 115. The default PCO value may indicate that the default network slice is enabled for the UE 105 and the new PCO value may indicate that the new network slice is not enabled (e.g., is paused) for the UE 105. As shown at step 16, the modem of the UE 105 may utilize the default network slice based on the default URSP and the default PCO value. The UE 105 may not utilize the new network slice since the new PCO value indicates that the new network slice is paused for the UE 105.

As shown at step 17 of FIG. 1C, the provisioning system may enable a subscriber associated with the UE 105 to resume the new network slice of the 4G core network 115. In some implementations, the subscriber associated with the UE 105 may utilize the provisioning system to resume the new network slice (e.g., after pausing the new network slice), and the provisioning system may generate provisioning information that causes the new network slice to be resumed. As shown at step 18, the provisioning system may provide the provisioning information to the 4G core network 115. The provisioning information may cause the 4G core network 115 to resume the new network slice for the UE 105.

As shown at step 19 of FIG. 1C, the modem of the UE 105 may receive, from the 4G core network 115, information associated with the default network slice and the new network slice of the 4G core network 115. The information associated with the default network slice and the new network slice may include a default PCO value (e.g., with default slice PCO=1) for the default network slice of the 4G core network 115 and a new PCO value (e.g., with new slice PCO=1) for the new network slice of the 4G core network 115. The default PCO value may indicate that the default network slice is enabled for the UE 105 and the new PCO value may indicate that the new network slice is enabled (e.g., is resumed) for the UE 105. As shown at step 20, the modem of the UE 105 may utilize the default network slice and the new network slice based on the updated URSP, the default PCO value, and the new PCO value. In this way, the PCO values may be dynamically changed when a network slice is paused or resumed and may be utilized to cause the UE 105 to read an updated URSP from the SIM.

As shown in FIG. 1D, and by reference number 125, the UE 105 may utilize a URSP, received from the 5G core network and for network slicing of traffic, when connected to the 5G core network. For example, network slicing may require the UE 105 to connect to the PCF in the 5G core network. When the UE 105 is connected to the 5G core network, the UE 105 may connect to the PCF and may receive a URSP from the PCF. The URSP provides a way to manage network slice information for the UE 105. The URSP is a network slice feature which informs the UE 105 about a network slice status. The URSP enables the UE 105 to automatically switch between different network slices according to which application is being utilized by the UE 105. Thus, the UE 105 may utilize the URSP for network slicing of traffic when the UE 105 is connected to the 5G core network.

As further shown in FIG. 1D, and by reference number 130, the 5G core network may provide the URSP to the 4G core network 115. For example, signaling between 5G core network and the 4G core network 115 may be established using an existing interface (e.g., an n26 interface) defined in the 3GPP. The 5G core network may utilize the interface to provide the URSP to the 4G core network 115, and the 4G core network 115 may receive the URSP from the 5G core network.

As further shown in FIG. 1D, and by reference number 135, the UE 105 may utilize the URSP, based on PCO values received from the 4G core network 115 and for network slicing of traffic, when connected to the 4G core network 115. For example, when the UE 105 is connected to the 4G core network, the UE 105 may connect to a network device (e.g., a mobility management entity device (MME)) of the 4G core network 115 and may receive the PCO values from the MME corresponding to the URSP information to be used. In this way, the 4G core network 115 may provide updated PCO values to the UE 105 using the MME. The URSP enables the UE 105 to automatically switch between different network slices according to which application is being utilized by the UE 105. Thus, the UE 105 may utilize the URSP for network slicing of traffic when the UE 105 is connected to the 4G core network 115. The URSP information may be updated in the UE 105 using SIM OTA when the UE 105 is connected to the 4G core network 115.

In this way, a policy of a UE 105 in 4G network coverage may be updated. For example, the UE 105 may store a preconfigured URSP on a SIM of the UE 105 and may utilize the preconfigured URSP for network slicing information when in 4G network coverage. When the UE 105 is in 5G network coverage, the UE may utilize URSP information received from the PCF of the 5G core network. When the UE 105 is in 4G network coverage and there is any change on network slicing provisioning, the 4G core network 115 may trigger URSP updates for the SIM of the UE 105 via the SIM OTA system. The URSP updates may change the preconfigured URSP stored on the SIM of the UE 105. The UE 105 may enable or disable URSP information and specific network slices using operator-defined PCO values. Thus, the UE 105 may conserve computing resources, networking resources, and/or other resources that would have otherwise been consumed by failing to update URSP information for the UE 105 in the 4G core network 115, creating poor user experience issues for the UE 105 based on failing to update the URSP information for the UE 105 in the 4G core network 115, failing to provide proper network slices when the UE 105 pauses and/or resumes network slices, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
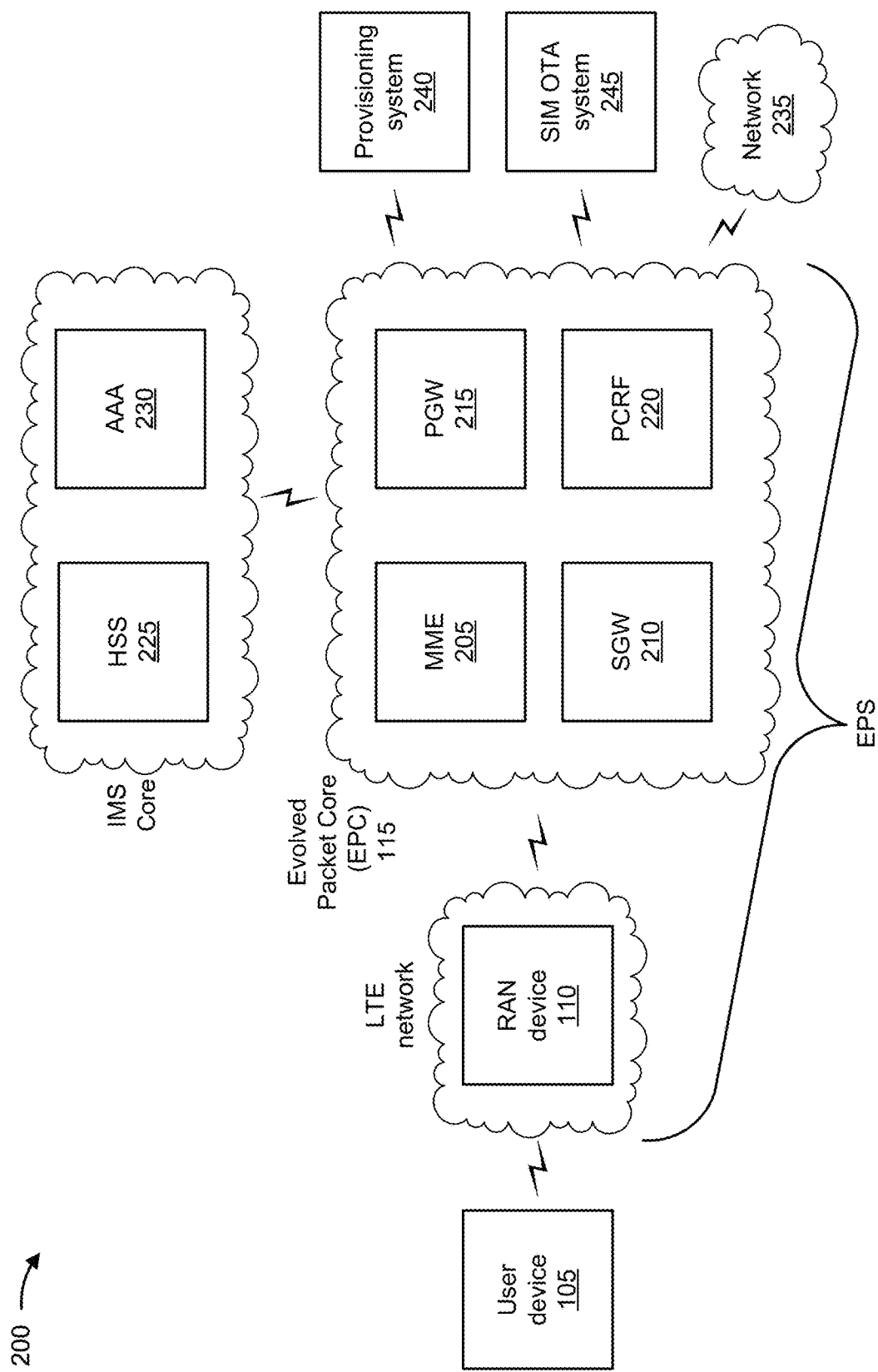
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the UE 105, the RAN device 110, the 4G core network 115, a network 235, a provisioning system 240, and/or a SIM OTA system 245. The 4G core network 115 (e.g., an EPC) may include an MME 205, a serving gateway (SGW) 210, a packet data network gateway (PGW) 215, a policy and charging rules function (PCRF) 220, a home subscriber server (HSS) 225, and an authentication, authorization, and accounting server (AAA) 230. Devices of the environment 200 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN device 110 may support, for example, a cellular radio access technology (RAT). The RAN device 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN device 110 may transfer traffic between the UE 105 (e.g., using a cellular RAT), one or more base stations (e.g., using a wireless interface or a backhaul interface, such as a wired backhaul interface), and/or the 4G core network 115. The RAN device 110 may provide one or more cells that cover geographic areas.

In some implementations, the RAN device 110 may perform scheduling and/or resource management for the UE 105 covered by the RAN device 110 (e.g., the UE 105 covered by a cell provided by the RAN device 110). In some implementations, the RAN device 110 may be controlled or coordinated by a network controller, which may perform load balancing, network-level configuration, and/or other operations. The network controller may communicate with the RAN device 110 via a wireless or wireline backhaul. In some implementations, the RAN device 110 may include a network controller, a self-organizing network (SON) module or component, or a similar module or component. In other words, the RAN device 110 may perform network control, scheduling, and/or network management functions (e.g., for uplink, downlink, and/or sidelink communications of the UE 105 covered by the RAN device 110).

Some implementations are described herein as being performed within a long-term evolution (LTE) network for explanatory purposes. Some implementations may be performed within a network that is not an LTE network, such as a third generation (3G) network or a 5G network.

The environment 200 may include an evolved packet system (EPS) that includes an LTE network and/or an EPC that operate based on a 3GPP wireless communication standard. The EPC may include the MME 205, the SGW 210, PGW 215, and/or the PCRF 220 to enable the UE 105 to communicate with the network 235 and/or an Internet protocol (IP) multimedia subsystem (IMS) core. The IMS core may include the HSS 225 and/or the AAA 230, and may manage device registration and authentication, session initiation, and/or other operations associated with the UE 105. The HSS 225 and/or the AAA 230 may reside in the EPC and/or the IMS core.

The MME 205 includes one or more devices, such as one or more server devices, capable of managing authentication, activation, deactivation, and/or mobility functions associated with the UE 105. In some implementations, the MME 205 may perform operations relating to authentication of the UE 105. Additionally, or alternatively, the MME 205 may facilitate the selection of a particular SGW 210 and/or a particular PGW 215 to provide traffic to and/or from the UE 105. The MME 205 may perform operations associated with handing off the UE 105 from a first RAN device 110 to a second RAN device 110 when the UE 105 is transitioning from a first cell associated with the first RAN device 110 to a second cell associated with the second RAN device 110. Additionally, or alternatively, the MME 205 may select another MME (not pictured), to which the UE 105 should be handed off (e.g., when the UE 105 moves out of range of the MME 205).

The SGW 210 includes one or more devices capable of routing packets. For example, the SGW 210 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, the SGW 210 may aggregate traffic received from one or more RAN devices 110 associated with the LTE network, and may send the aggregated traffic to the network 235 (e.g., via the PGW 215) and/or other network devices associated with the EPC and/or the IMS core. The SGW 210 may receive traffic from the network 235 and/or other network devices, and may send the received traffic to the UE 105 via the RAN device 110. Additionally, or alternatively, the SGW 210 may perform operations associated with handing off the UE 105 to and/or from an LTE network.

The PGW 215 includes one or more devices capable of providing connectivity for the UE 105 to external packet data networks (e.g., other than the depicted EPC and/or LTE network). For example, the PGW 215 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, the PGW 215 may aggregate traffic received from one or more SGWs 210, and may send the aggregated traffic to the network 235. Additionally, or alternatively, the PGW 215 may receive traffic from the network 235, and may send the traffic to the UE 105 via the SGW 210 and the RAN device 110. The PGW 215 may record data usage information (e.g., byte usage), and may provide the data usage information to the AAA 230.

The PCRF 220 includes one or more devices, such as one or more server devices, capable of providing policy control decision and flow-based charging control functionalities. For example, the PCRF 220 may provide network control regarding service data flow detection, gating, and/or QoS and flow-based charging, among other examples. In some implementations, the PCRF 220 may determine how a certain service data flow is to be treated, and may ensure that user plane traffic mapping and treatment is in accordance with a user subscription profile.

The HSS 225 includes one or more devices, such as one or more server devices, capable of managing (e.g., receiving, generating, storing, processing, and/or providing) information associated with the UE 105. For example, the HSS 225 may manage subscription information associated with the UE 105, such as information that identifies a subscriber profile of a user associated with the UE 105, information that identifies services and/or applications that are accessible to the UE 105, location information associated with the UE 105, a network identifier (e.g., a network address) that identifies the UE 105, information that identifies a treatment of the UE 105 (e.g., quality of service information, a quantity of minutes allowed per time period, a quantity of data consumption allowed per time period, etc.), and/or similar information. The HSS 225 may provide this information to one or more other devices of the environment 200 to support the operations performed by those devices.

The AAA 230 includes one or more devices, such as one or more server devices, that perform authentication, authorization, and/or accounting operations for communication sessions associated with the UE 105. For example, the AAA 230 may perform authentication operations for the UE 105 and/or a user of the UE 105 (e.g., using one or more credentials), may control access, by the UE 105, to a service and/or an application (e.g., based on one or more restrictions, such as time-of-day restrictions, location restrictions, single or multiple access restrictions, read/write restrictions, etc.), may track resources consumed by the UE 105 (e.g., a quantity of voice minutes consumed, a quantity of data consumed, etc.), and/or may perform similar operations.

The network 235 includes one or more wired and/or wireless networks. For example, the network 235 may include a cellular network (e.g., a 5G network, an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

The provisioning system 240 may include one or more devices capable of receiving, generating, storing, processing, providing, and/or routing information, as described elsewhere herein. The provisioning system 240 may include a communication device and/or a computing device. For example, the provisioning system 240 may include a server, such as an application server, a client server, a web server, a database server, a host server, a proxy server, a virtual server (e.g., executing on computing hardware), or a server in a cloud computing system. In some implementations, the provisioning system 240 may include computing hardware used in a cloud computing environment.

The SIM OTA system 245 may include one or more devices capable of receiving, generating, storing, processing, providing, and/or routing information, as described elsewhere herein. The SIM OTA system 245 may include a communication device and/or a computing device. For example, the SIM OTA system 245 may include a server, such as an application server, a client server, a web server, a database server, a host server, a proxy server, a virtual server (e.g., executing on computing hardware), or a server in a cloud computing system. In some implementations, the SIM OTA system 245 may include computing hardware used in a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
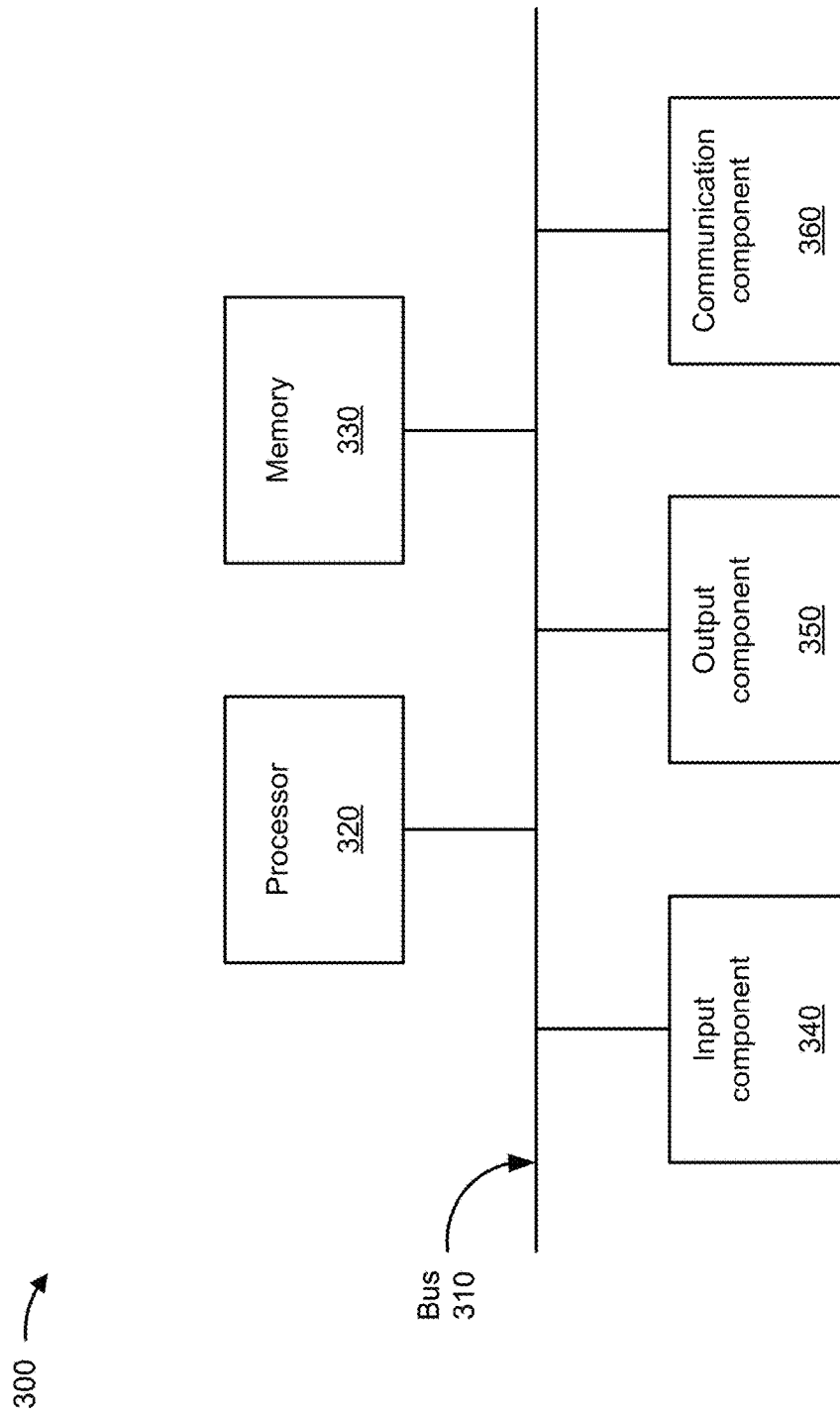
FIG. 3 is a diagram of example components of one or more devices of FIG. 2.

FIG. 3 is a diagram of example components of a device 300, which may correspond to the UE 105, the RAN device 110, the MME 205, the SGW 210, the PGW 215, the PCRF 220, the HSS 225, the AAA 230, the provisioning system 240, and/or the SIM OTA system 245. In some implementations, the UE 105, the RAN device 110, the MME 205, the SGW 210, the PGW 215, the PCRF 220, the HSS 225, the AAA 230, the provisioning system 240, and/or the SIM OTA system 245 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
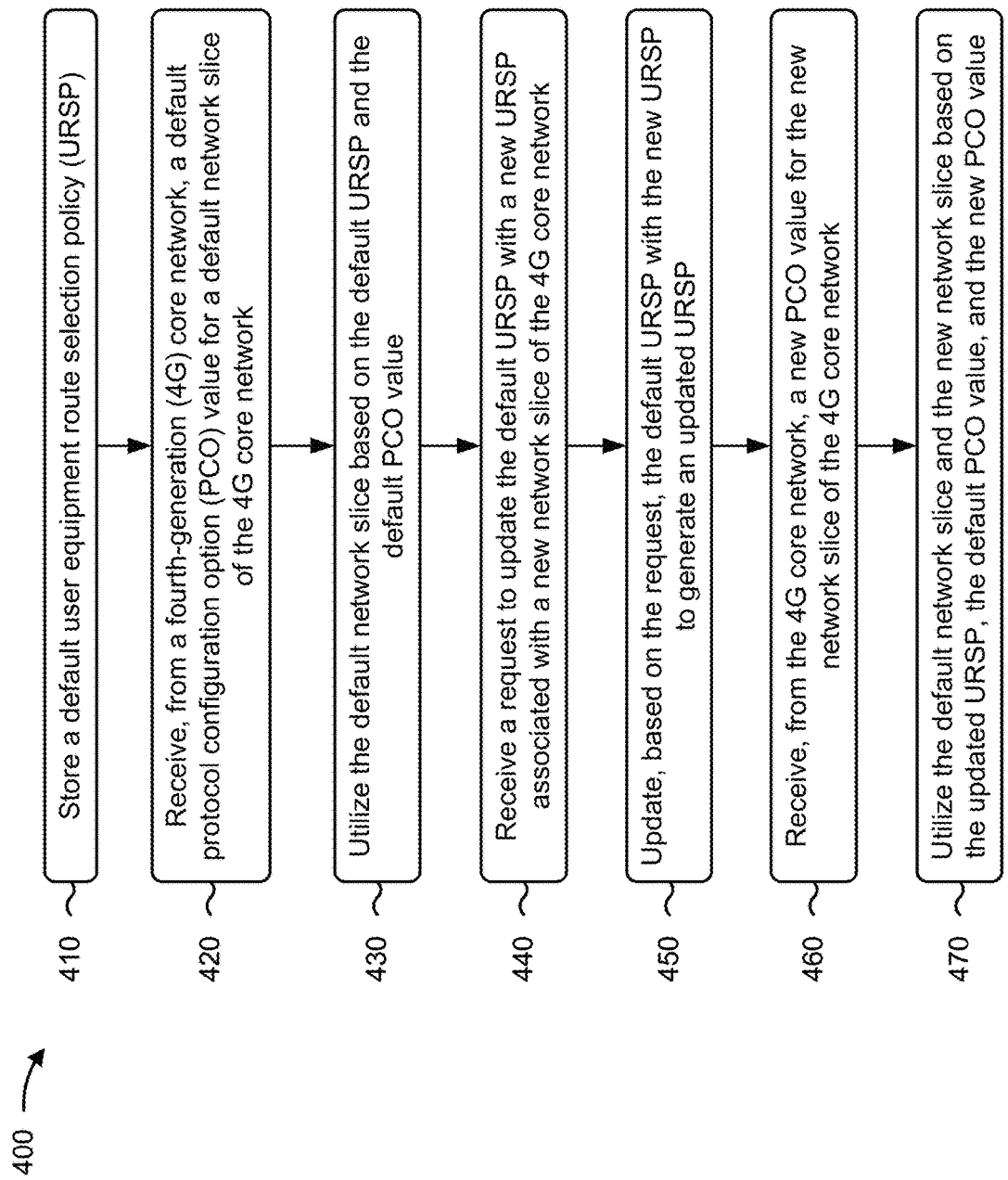
FIG. 4 is a flowchart of an example process for updating a policy of a UE in 4G network coverage.

FIG. 4 is a flowchart of an example process 400 for updating a policy of a UE in 4G network coverage. In some implementations, one or more process blocks of FIG. 4 may be performed by a UE (e.g., the UE 105). In some implementations, one or more process blocks of FIG. 4 may be performed by another device or a group of devices separate from or including the network device, such as a network device (e.g., the MME 205) of a 4G core network (e.g., the 4G core network 115). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include storing a default URSP (block 410). For example, the UE may store a default URSP, as described above. In some implementations, storing the default URSP includes storing the default URSP in a SIM of the UE.

As further shown in FIG. 4, process 400 may include receiving, from a 4G core network, a default PCO value for a default network slice of the 4G core network (block 420). For example, the UE may receive, from a 4G core network, a default PCO value for a default network slice of the 4G core network, as described above. In some implementations, the default PCO value includes a first value when the default network slice is enabled or a second value when the default network slice is disabled.

As further shown in FIG. 4, process 400 may include utilizing the default network slice based on the default URSP and the default PCO value (block 430). For example, the UE may utilize the default network slice based on the default URSP and the default PCO value, as described above.

As further shown in FIG. 4, process 400 may include receiving a request to update the default URSP with a new URSP associated with a new network slice of the 4G core network (block 440). For example, the UE may receive a request to update the default URSP with a new URSP associated with a new network slice of the 4G core network, as described above. In some implementations, the new network slice is provisioned by a subscriber associated with the UE. In some implementations, the new network slice is provisioned by a provisioning system associated with the UE. In some implementations, receiving the request to update the default URSP with the new URSP includes receiving the request to update the default URSP with the new URSP from a SIM OTA system. In some implementations, receiving the request to update the default URSP with the new URSP includes receiving the request to update the default URSP with the new URSP from an MME device of the 4G core network. In some implementations, one or more of the default URSP or the new URSP is received by the 4G core network from a 5G core network.

As further shown in FIG. 4, process 400 may include updating, based on the request, the default URSP with the new URSP to generate an updated URSP (block 450). For example, the UE may update, based on the request, the default URSP with the new URSP to generate an updated URSP, as described above.

As further shown in FIG. 4, process 400 may include receiving, from the 4G core network, a new PCO value for the new network slice of the 4G core network (block 460). For example, the UE may receive, from the 4G core network, a new PCO value for the new network slice of the 4G core network, as described above. In some implementations, the new PCO value includes a first value when the new network slice is enabled or a second value when the new network slice is disabled.

As further shown in FIG. 4, process 400 may include utilizing the default network slice and the new network slice based on the updated URSP, the default PCO value, and the new PCO value (block 470). For example, the UE may utilize the default network slice and the new network slice based on the updated URSP, the default PCO value, and the new PCO value, as described above.

In some implementations, process 400 includes receiving, from the 4G core network, another PCO value for the new network slice based on the new network slice being paused, and utilizing the default network slice based on the default URSP, the default PCO, and the other PCO value. In some implementations, process 400 includes receiving, once again from the 4G core network, the new PCO value for the new network slice based on the new network slice being resumed, and utilizing the default network slice and the new network slice based on the updated URSP, the default PCO, and the new PCO value.

In some implementations, process 400 includes receiving, from a 5G core network, another URSP for a network slice of the 5G core network, and utilizing the network slice of the 5G core network based on the other URSP. In some implementations, receiving the other URSP for the network slice of the 5G core network includes receiving the other URSP for the network slice of the 5G core network from a PCF of the 5G core network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

As used herein, satisfying a threshold may depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   storing, by a user equipment, a default user equipment route selection policy (URSP);
   receiving, by the user equipment and from a fourth-generation (4G) core network, a default protocol configuration option (PCO) value for a default network slice of the 4G core network;
   utilizing, by the user equipment, the default network slice based on the default URSP and the default PCO value;
   receiving, by the user equipment, a request to update the default URSP with a new URSP associated with a new network slice of the 4G core network;
   updating, by the user equipment and based on the request, the default URSP with the new URSP to generate an updated URSP;
   receiving, by the user equipment and from the 4G core network, a new PCO value for the new network slice of the 4G core network; and
   utilizing, by the user equipment, the default network slice and the new network slice based on the updated URSP, the default PCO value, and the new PCO value.

2. The method of claim 1, wherein the new network slice is provisioned by a subscriber associated with the user equipment.

3. The method of claim 1, wherein the new network slice is provisioned by a provisioning system associated with the user equipment.

4. The method of claim 1, wherein receiving the request to update the default URSP with the new URSP comprises:
   receiving the request to update the default URSP with the new URSP from a subscriber identity module over-the-air system.

5. The method of claim 1, wherein receiving the request to update the default URSP with the new URSP comprises:
   receiving the request to update the default URSP with the new URSP from a mobility management entity device of the 4G core network.

6. The method of claim 1, wherein the default PCO value includes a first value when the default network slice is enabled or a second value when the default network slice is disabled.

7. The method of claim 1, wherein the new PCO value includes a first value when the new network slice is enabled or a second value when the new network slice is disabled.

8. A user equipment, comprising:
   one or more processors configured to:
      store a default user equipment route selection policy (URSP);
      receive, from a fourth-generation (4G) core network, a default protocol configuration option (PCO) value for a default network slice of the 4G core network;
      utilize the default network slice based on the default URSP and the default PCO value;
      receive a request to update the default URSP with a new URSP associated with a new network slice of the 4G core network,
         wherein the new network slice is provisioned by one of a subscriber associated with the user equipment or a provisioning system associated with the user equipment;
      update, based on the request, the default URSP with the new URSP to generate an updated URSP;
      receive, from the 4G core network, a new PCO value for the new network slice of the 4G core network; and
      utilize the default network slice and the new network slice based on the updated URSP, the default PCO value, and the new PCO value.

9. The user equipment of claim 8, wherein one or more of the default URSP or the new URSP is received by the 4G core network from a fifth-generation core network.

10. The user equipment of claim 8, wherein the one or more processors are further configured to:
    receive, from the 4G core network, another PCO value for the new network slice based on the new network slice being paused; and
    utilize the default network slice based on the default URSP, the default PCO, and the other PCO value.

11. The user equipment of claim 10, wherein the one or more processors are further configured to:
    receive, once again from the 4G core network, the new PCO value for the new network slice based on the new network slice being resumed; and
    utilize the default network slice and the new network slice based on the updated URSP, the default PCO, and the new PCO value.

12. The user equipment of claim 8, wherein the one or more processors are further configured to:
    receive, from a fifth-generation (5G) core network, another URSP for a network slice of the 5G core network; and
    utilize the network slice of the 5G core network based on the other URSP.

13. The user equipment of claim 12, wherein the one or more processors, to receive the other URSP for the network slice of the 5G core network, are configured to:
    receive the other URSP for the network slice of the 5G core network from a policy control function of the 5G core network.

14. The user equipment of claim 8, wherein the one or more processors, to store the default URSP, are configured to:
    store the default URSP in a subscriber identity module of the user equipment.

15. A non-transitory computer-readable medium storing a set of instructions, the set of instructions comprising:

one or more instructions that, when executed by one or more processors of a user equipment, cause the user equipment to:
  store a default user equipment route selection policy (URSP);
  receive, from a fourth-generation (4G) core network, a default protocol configuration option (PCO) value for a default network slice of the 4G core network;
  utilize the default network slice based on the default URSP and the default PCO value;
  receive, from one of a subscriber identity module over-the-air system or a mobility management entity device of the 4G core network, a request to update the default URSP with a new URSP associated with a new network slice of the 4G core network;
  update, based on the request, the default URSP with the new URSP to generate an updated URSP;
  receive, from the 4G core network, a new PCO value for the new network slice of the 4G core network; and
  utilize the default network slice and the new network slice based on the updated URSP, the default PCO value, and the new PCO value.

16. The non-transitory computer-readable medium of claim 15, wherein the default PCO value includes a first value when the default network slice is enabled or a second value when the default network slice is disabled.

17. The non-transitory computer-readable medium of claim 15, wherein the new PCO value includes a first value when the new network slice is enabled or a second value when the new network slice is disabled.

18. The non-transitory computer-readable medium of claim 15, wherein one or more of the default URSP or the new URSP is received by the 4G core network from a fifth-generation core network.

19. The non-transitory computer-readable medium of claim 15, wherein the one or more instructions further cause the user equipment to:
  receive, from the 4G core network, another PCO value for the new network slice based on the new network slice being paused;
  utilize the default network slice based on the default URSP, the default PCO, and the other PCO value;
  receive, once again from the 4G core network, the new PCO value for the new network slice based on the new network slice being resumed; and
  utilize the default network slice and the new network slice based on the updated URSP, the default PCO, and the new PCO value.

20. The non-transitory computer-readable medium of claim 15, wherein the one or more instructions further cause the user equipment to:
  receive, from a fifth-generation (5G) core network, another URSP for a network slice of the 5G core network; and
  utilize the network slice of the 5G core network based on the other URSP.

* * * * *